United States Patent [19]

Howell

[11] 4,299,887

[45] Nov. 10, 1981

[54] TEMPERATURE SENSITIVE ELECTRICAL ELEMENT, AND METHOD AND MATERIAL FOR MAKING THE SAME

[75] Inventor: Robert G. Howell, Boone, N.C.

[73] Assignee: TRW, Inc., Cleveland, Ohio

[21] Appl. No.: 36,566

[22] Filed: May 7, 1979

[51] Int. Cl.$^{3}$ .......................... B32B 9/00; C04B 31/02

[52] U.S. Cl. .......................................... 428/428; 106/300; 106/290; 252/514; 252/520; 427/101; 428/328; 428/446; 428/426; 75/252; 75/254; 501/18; 501/19

[58] Field of Search ............... 428/428, 539, 446, 328; 427/101; 106/300, 290; 252/514, 520

[56] References Cited

U.S. PATENT DOCUMENTS

| | | | |
|---|---|---|---|
| 4,060,663 | 11/1977 | Merz et al. | 428/328 |
| 4,146,677 | 3/1979 | Merz et al. | 428/428 |
| 4,168,343 | 9/1979 | Arai et al. | 428/428 |
| 4,194,022 | 3/1980 | Giller | 427/124 |
| 4,209,764 | 7/1980 | Merz et al. | 427/101 |

OTHER PUBLICATIONS

Titanium Nitride/Titanium Resistive Glazes", Electronic Component Conference, Haung, 1970, pp. 34-39.

"Temperature-Sensitive Resistor is Linear", Electronic, Oct. 3, 1974, pp. 135-136, Mattera.

*Primary Examiner*—Marion McCamish
*Assistant Examiner*—E. Rollins Buffalow
*Attorney, Agent, or Firm*—Jacob Trachtman

[57] ABSTRACT

A temperature sensitive electrical element and method of making the same comprising the steps of applying to the surface of a substrate and firing a mixture of glass frit and particles of titanium dioxide ($TiO_2$), and titanium metal. The mixture is fired in a non oxidizing, inert, or reducing atmosphere at a temperature which softens of the glass frit. When cooled, an element is provided with a glass film strongly bonded to the substrate and having dispersed therein conductive particles mainly of titanium oxide ($Ti_2O_3$). The element produced can be terminated by the use of electroless plating and provides a substantially linear resistance to temperature characteristic and a relatively high temperature coefficient of resistance.

25 Claims, 1 Drawing Figure

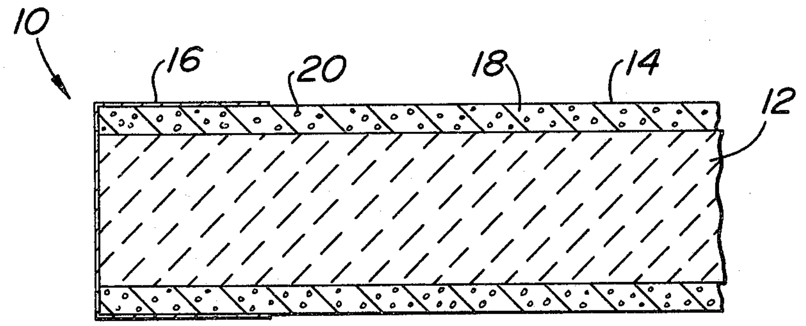
10
16
20
18
14
12

TEMPERATURE SENSITIVE ELECTRICAL ELEMENT, AND METHOD AND MATERIAL FOR MAKING THE SAME

BACKGROUND OF THE INVENTION

The present invention relates to a temperature sensitive electrical element, and more particularly to an electrical element of a vitreous enamel refractory metal oxide having a highly linear resistance to temperature characteristic and a relatively high temperature coefficient of resistance, and a method and material for making the same.

In general, temperature sensitive electrical elements of the vitreous enamel resistor type comprise a substrate having a film of glass and particles of a conductive material embedded in and dispersed throughout the glass film. The elements are made by first forming a mixture of a glass frit and particles of the conductive material. The mixture is applied to substrates and fired at a temperature at which the glass frit softens. Certain vitreous resistors such as those utilizing precious metals and precious metal oxides are made by firing in an oxidizing atmosphere, while other vitreous resistors such as those using refractory metals, and refractory metal borides and nitrides, are formed by firing in a non-oxidizing environment. When cooled, the glass solidifies to form the resistors with a glass film having the conductive particles therein.

In order to provide electrical connections to the elements, it is desirable to provide a conductive termination at each end of their resistance films. Heretofore, as disclosed in U.S. Pat. No. 3,358,362 issued Dec. 19, 1967, terminations for vitreous enamel resistors have been provided by the electroless plating of a film of a metal, such as nickel or copper. However, it has been found that such electroless metal film terminations are not compatible with certain vitreous enamel resistance films. In order to make electrical connections to such resistor films, a precious metal, such as silver, is usually applied by another process.

The electrical temperature sensors which heretofore have been produced have characteristically exhibit a non-linear resistance versus temperature curve, or a linear curve over only a portion of the temperature range of −55° C. to +150° C. required for a wide range temperature sensor. The requirement for carefully selecting only certain sensors from a production batch to provide the desirable properties, and the need for compensating networks result in a higher cost for producing sensors with a linear characteristic. Such elements should also provide relatively high temperature coefficients of resistance.

SUMMARY OF THE INVENTION

Therefore, it is an object of the invention to provide a novel temperature sensitive electrical element and a method and material for making same.

Another object of the invention is to provide a novel temperature sensitive electrical element of the vitreous enamel resistor type having a highly linear resistance to temperature characteristic and a relatively high temperature coefficient of resistance, and a method and material for making same.

Another object of the invention is to provide a temperature sensitive electrical element of a refractory metal oxide providing a highly linear resistance to temperature characteristic over a range of temperatures between −55° C. and +150° C. and the method and material for making same.

Another object of the invention is to provide a novel method and material for a temperature sensitive electrical element having a relatively high negative temperature coefficient of resistance.

Another object of the invention is to provide a novel temperature sensitive electrical element of the vitreous enamel resistor type containing conductive titanium oxide ($Ti_2O_3$) which can be terminated by an electroless plated nickel or copper film and a method and material for making same.

Another object of the invention is to provide a novel method and material for making a high quality temperature sensitive electrical element having properties which may be controlled and which can be easily fabricated of inexpensive materials.

These objects are achieved by applying a coating to a substrate of a mixture of a glass frit and particles containing titanium dioxide and titanium metal. The substrate and coating are then heated or fired in an atmosphere and at a temperature at which the glass frit softens, and a glass film is formed which is strongly bonded to the substrate and has conductive titanium particles embedded and dispersed therethroughout. The firing atmosphere is non oxidizing, or reducing, as is for example, provided by argon, nitrogen or forming gas. The coated substrate is heated over a time duration depending upon the atmosphere and firing temperature for obtaining partial softening and formation of a resistor glaze film with conductive titanium oxide particles mainly of titanium oxide ($Ti_2O_3$) dispersed therethrough.

The electrical element thus formed, can be terminated by a nickel or copper film applied in contact with a portion of the resistor glass film by an electroless plating process as described in U.S. Pat. No. 3,358,362.

The invention accordingly, comprises the several steps of the method and the relation of one or more of such steps with respect to each of the others, and the element and its termination possessing the features, properties, and the relationships of constituents which are exemplified in the following detailed disclosure, with the scope of the invention being indicated by the claims.

For a fuller understanding of the nature and objects of the invention, reference should be had to the following detailed description taken in connection with the accompanying drawing.

DESCRIPTION OF THE DRAWING

The FIGURE of the drawing is a sectional view of a resistor of the present invention terminated by an electroless plated film.

DETAILED DESCRIPTION

Referring to the drawing, a temperature sensitive electrical element 10, embodying the invention, comprises a substrate 12 and a resistance film 14 on the surface of the substrate. The substrate 12 may be in the form of a rod and composed of an electrical insulating material, such as provided by ceramic, alumina or steatite materials. The resistance film 14 is a vitreous enamel film which comprises a film of glass 18 having particles of a conductive material 20 embedded therein and dispersed therethroughout. The element 10 may include a metal termination film 16 in contact with the resistance film 14, which film may be of nickel or copper and applied by an electroless plating method.

The material 20 comprises conductive particles mainly of titanium oxide ($Ti_2O_3$), and other reaction products provided by firing in a non oxidizing atmosphere of a resistance material comprising a mixture of glass frit and particles of titanium dioxide and titanium metal, which are embedded in and dispersed throughout the glass film 18. The amount present in the resistance film 14 of the conductive particles containing titanium is desirably between 35% and 50% by weight. The glass used may be any glass which is substantially stable at the firing temperature of the resistance material and which has a suitable softening temperature, i.e., a softening temperature which is below the melting point of the particles. The glasses which are most preferable are the borosilicate glasses, and the barium, calcium and other alkaline earth borosilicates.

To make the resistance film 14, a resistance material is first prepared. The resistance material comprises a mixture of a fine glass frit and particles containing titanium including titanium dioxide ($TiO_2$), and titanium metal. The particles containing titanium can be premilled and then mixed and milled with the fine glass frit. The resistance material can also be prepared by mixing together and milling the glass frit, titanium dioxide and titanium metal without premilling the titanium containing particles. Resistance materials produced by the premilling of the titanium dioxide and titanium particles prior to mixing with the glass frit are desirable however, because their use provides elements with more uniform properties. While the amount of the titanium dioxide and titanium metal particles, which may be included depends upon the amount of resulting conductive particles required for providing the selected resistance, an amount of 35 to 50% by weight is preferred for obtaining a substantially linear resistance to temperature relationship providing a deviation of resistance from linearity of not more than 2% for any temperature interval of 100° C. between −55° C. and +150° C., and a relatively high temperature coefficient of resistance greater than 2000 parts per million/°C. In general, the weight ratio of titanium metal to titanium dioxide particles may be varied for providing a variety of glazes and different properties for the temperature sensitive element. For obtaining the desirable linear resistance to temperature relationship for the temperature sensitive element, the most linear characteristic can be obtained by using a resistance material in which titanium metal is present in an amount of 70 to 130% by weight of titanium dioxide present.

After the glass frit and the particles containing titanium have been thoroughly mixed together, such as by milling, in a suitable vehicle, such as water, butyl carbitol acetate, a mixture of butyl carbitol acetate and toluol, or any other well known screening medium, the viscosity of the mixture is adjusted for the desired manner of applying the material, either by adding or removing some of the vehicle medium. The resistance material is then applied to the substrate 12 by any desired technique, such as brushing, dipping, spraying or screen stencil application. The coated film is then preferably dried, as by heating at a low temperature, such as 150° C. for about 10 minutes to remove the liquid media. Next, the film may be heated at a higher temperature, of about 400° C. or higher, to burn off the vehicle. Finally, the film is fired at a temperature at which the glass softens, generally at least 600° C., and preferable between 600° C. to 1150° C., in a non oxidizing, inert, or reducing atmosphere, such as provided by argon, nitrogen or forming gas. After the resistance film 14 is formed and cooled on the substrate 12, the conductive termination film 16 can be applied to the substrate by electroless plating in the manner well known in the art.

EXAMPLE I

A resistance material designated "Glaze A" was made by ball milling together a mixture of particles by weight of about 15% titanium dioxide ($TiO_2$), and about 25% titanium metal, with about 60% of fine glass frit in a butyl carbitol acetate medium. The frit was of an alkaline earth borosilicate composed, by weight, of 52% barium oxide (BaO), 20% boron oxide ($B_2O_3$), 20% silicon dioxide ($SiO_2$), 4% aluminum oxide ($Al_2O_3$), and 4% titanium oxide ($TiO_2$).

Alumina rods were coated by being dipped in the resistance material, dried and then fired over a cycle of approximately 20 minutes at a peak temperature of 900° C. in a nitrogen atmosphere. The cooled coated rods were cut to the size of individual elements and then subjected to electroless plating to provide thereon nickel termination films with desirable properties. The average resistance value, and temperature coefficients of resistance, for the temperature sensitive electrical elements made of Glaze A are provided below in the Table.

EXAMPLE II

A resistance material designated "Glaze B" was made in the same manner as described in Example I, except that the mixture included by weight about 28% titanium dioxide ($TiO_2$), about 17% titanium metal, and about 55% glass frit. The elements, were made in the same manner as described in Example I. The resistance values, and temperature coefficients of resistance, for the temperature sensitive electrical elements made of Glaze B are shown in the Table.

EXAMPLE III

The resistance material designated "Glaze C" was made by blending equal amounts of Glaze A and Glaze B, of Examples I and II, to provide about 21% titanium dioxide, about 21% titanium metal, and about 58% glass frit. The resistors were made in the same manner as described in Example I. The resistance values, and temperature coefficients of resistance for the temperature sensitive electrical elements are also shown in the Table.

EXAMPLE IV

A resistance material designated "Glaze D" was made in the same manner as described in Example I, except that the mixture included by weight of about 18% titanium dioxide ($TiO_2$), about 18% titanium metal, and about 64% glass frit. The elements, were made in the same manner as described in Example I. The resistance values, and temperature coefficients of resistance, for the temperature sensitive electrical elements made of Glaze D are shown in the Table.

TABLE

| Resistance Material | Resistivity (ohms/square) | Temperature Coefficient of Resistance (PPM/°C.) −55° C. to +25° C. | +25° C. to +150° C. |
|---|---|---|---|
| Glaze A | 18 | −1475 | −1910 |

TABLE-continued

| Resistance Material | Resistivity (ohms/square) | Temperature Coefficient of Resistance (PPM/°C.) −55° C. to +25° C. | +25° C. to +150° C. |
|---|---|---|---|
| Glaze B | 245 | −5776 | −3938 |
| Glaze C | 63 | −2987 | −2982 |
| Glaze D | 320 | −3385 | −2514 |

The Table shows the resistivity, and temperature coefficients of resistance provided by elements made with resistance materials having various proportions of titanium dioxide ($TiO_2$) and titanium metal. The electrical elements produced have highly negative temperature coefficients of resistance of 2000 parts per million/°C. or more negative values, and are characterized by a highly linear relationship for changes in resistance with a variation of temperature within the range of −55° C. to +150° C. The resistance materials of Glaze D of the Table, which is made of an equal proportion by weight of titanium dioxide to titanium metal, showed upon testing a deviation of resistance from linearity of not more than 2% for any temperature interval of 100° C. between −55° C. and +150° C.

The electrical elements of the invention can be terminated with electroless plated nickel or copper terminations and provided outstanding stability. Electrical elements of 1 kilohom and 10 kilohoms which were tested for stability, exhibited an average change of resistance of less than 0.8% after 3000 hours of storage at a temperature of 175° C.

The present invention may be carried out and embodied in other specific forms without departing from the spirit or essential attributes thereof, and, accordingly, reference should be made to the appended claims, rather than the foregoing specification for indicating the scope of the invention.

What is claimed is:

1. A material consisting essentially of a mixture of particles of titanium dioxide ($TiO_2$), titanium metal, and a glass frit, the glass frit being present in an amount of about 50 to 60% by weight and the particles of titanium metal being present in an amount of about 70 to 130% by weight of the titanium oxide.

2. A resistor material in accordance with claim 1, in which the glass frit is a borosilicate glass.

3. A resistor material in accordance with claim 1 or 2 in which the glass frit is an alkaline earth borosilicate glass.

4. An electrical element formed by firing on a substrate the material of claim 1, 2 or 3.

5. A temperature sensitive electrical element characterized by a highly linear resistance to temperature relationship and a relatively high negative temperature coefficient of resistance comprising a substrate and a resistor, the resistor including a film of glass on a surface of the substrate having embedded therein and dispersed therethroughout conductive particles composed mainly of an oxide of titanium.

6. An electrical element in accordance with claim 5 in which the glass is present in an amount of about 50 to 65% by weight of the resistance element.

7. An electrical element in accordance with claim 5 in which the titanium oxide particles are mainly particles of titanium oxide ($Ti_2O_3$) embedded in and dispersed throughout the glass film of the resistor.

8. An electrical element in accordance with claim 7 in which the glass is present in an amount of 50 to 65% by weight of the resistance element.

9. An electrical element in accordance with claim 8 in which the glass is a borosilicate glass.

10. An electrical element in accordance with claim 5 or 8 in which the resistance to temperature relationship of the resistor is highly linear with a deviation of resistance from linearity of not more than 2% for any temperature interval of 100° C. between −55° C. and +150° C.

11. An electrical element in accordance with claim 5 or 8 in which the glass is present in an amount of 50 to 65% by weight and is an alkaline earth borosilicate glass, and the resistor provides a highly negative temperature coefficient of resistance of at least about 2000 parts per million/°C.

12. A method of making a temperature sensitive electrical element characterized by a highly linear resistance to temperature relationship and a relatively high negative temperature coefficient of resistance comprising the steps of (a) coating a surface of a substrate with a mixture of glass frit and particles consisting essentially of titanium comprising titanium dioxide, and titanium metal, (b) firing the mixture in an atmosphere and at a temperature to soften the glass and provide therein conductive titanium oxide particles mainly of titanium oxide ($Ti_2O_3$), and then (c) cooling the coated substrate to form a resistor film of glass having conductive titanium oxide particles mainly of titanium oxide ($Ti_2O_3$) dispersed therethroughout.

13. The method in accordance with claim 12 in which the particles containing titanium of step (a) are present in an amount of 35 to 50% by weight.

14. The method in accordance with claim 12 in which in step (a) the titanium metal is present in an amount of 70 to 130% by weight of the titanium dioxide and the glass frit is 50 to 65% by weight of the mixture.

15. The method in accordance with claim 14 in which the particles containing titanium of step (a) are present in an amount of 35 to 50% by weight.

16. The method in accordance with claim 12, 13, 14 or 15 in which in step (b) the mixture is fired at a temperature of at least 600° C. in a non oxidizing atmosphere.

17. The method in accordance with claim 12, 13, 14 or 15 in which in step (b) the mixture is fired at a temperature between 600° C. and 1150° C. in a nitrogen atmosphere.

18. The method in accordance with claim 12, 13, 14 or 15 in which the proportions of the components of the mixture of step (a) and the firing temperature of step (b) are selected to provide an electrical element in which the resistance to temperature relationship is highly linear with a deviation of resistance from linearity of not more than 2% for any temperature interval of 100° C. between −55° C. and +150° C., and provides a highly negative temperature coefficient of resistance of at least about 2000 parts per million/°C.

19. A temperature sensitive electrical element characterized by a highly linear resistance to temperature relationship and a relatively high negative temperature coefficient of resistance made by the steps of (a) coating a surface of a substrate with a mixture of glass frit and particles consisting essentially of titanium comprising titanium dioxide, and titanium metal (b) firing the mixture in an atmosphere and at a temperature to soften the glass and provide therein conductive titanium oxide particles mainly of titanium oxide ($Ti_2O_3$), and then (c) cooling the coated substrate to form a resistor film of glass having conductive titanium particles mainly of titanium oxide ($Ti_2O_3$) dispersed therethroughout.

20. The electrical element in accordance with claim 19 in which the particles containing titanium of step (a) are present in the amount of 35 to 50% by weight.

21. The electrical element in accordance with claim 19 in which in step (a) titanium metal is present in an amount of 70 to 130% by weight of the titanium dioxide and the glass frit is 50 to 65% by weight of the mixture.

22. The electrical element in accordance with claim 21 in which the particles containing titanium of step (a) are present in an amount of 35 to 50% by weight.

23. The electrical element in accordance with claim 19, 20, 21 or 22 in which in step (b) the mixture is fired at a temperature of at least 600° C. in a non oxidizing atmosphere.

24. The electrical element in accordance with claim 19, 20, 21 or 22 in which in step (b) the mixture is fired at a temperature between 600° C. and 1150° C. in a nitrogen atmosphere.

25. The electrical element in accordance with claim 19, 20, 21 or 22 in which the proportions of the components of the mixture of step (a) and the firing temperature of step (b) are selected to provide an electrical element in which the resistance to temperature relationship is highly linear with a deviation of resistance from linearity of not more than 2% for any temperature interval of 100° C. between −55° C. and +150° C., and provides a highly negative temperature coefficient of resistance of at least about 2000 parts per million/°C.

* * * * *

UNITED STATES PATENT AND TRADEMARK OFFICE
CERTIFICATE OF CORRECTION

PATENT NO. : 4,299,887

DATED : November 10, 1981

INVENTOR(S) : Robert G. Howell

It is certified that error appears in the above–identified patent and that said Letters Patent are hereby corrected as shown below:

Column 5, line 44, in claim 1, "60%" should read
-- 65% --

Signed and Sealed this

*Ninth* Day of *March 1982*

[SEAL]

*Attest:*

GERALD J. MOSSINGHOFF

*Attesting Officer* *Commissioner of Patents and Trademarks*